(12) United States Patent
Sasai et al.

(10) Patent No.: US 6,819,717 B1
(45) Date of Patent: Nov. 16, 2004

(54) IMAGE PROCESSING APPARATUS

(75) Inventors: Toshihiro Sasai, Kyoto (JP); Shingo Kokudo, Ibaraki (JP); Fumitaka Okamoto, Ibaraki (JP)

(73) Assignee: NuCORE Technology, Inc., Santa Clara, CA (US)

( * ) Notice: Subject to any disclaimer, the term of this patent is extended or adjusted under 35 U.S.C. 154(b) by 0 days.

(21) Appl. No.: 09/564,598

(22) Filed: May 3, 2000

(30) Foreign Application Priority Data

May 12, 1999 (JP) .......................................... 11-131976

(51) Int. Cl.$^7$ .............................................. H04N 7/12
(52) U.S. Cl. .................................. 375/240.29; 382/260
(58) Field of Search ..................... 375/240.29, 240.2; 382/260, 263, 264, 265, 250

(56) References Cited

U.S. PATENT DOCUMENTS

| | | | |
|---|---|---|---|
| 5,287,299 A | 2/1994 | Lin | |
| 5,706,216 A | 1/1998 | Reisch .................. | 364/715.02 |
| 5,862,266 A | 1/1999 | Hunter ..................... | 382/266 |
| 6,028,965 A * | 2/2000 | Normile ..................... | 382/250 |
| 6,122,318 A * | 9/2000 | Yamaguchi et al. ......... | 375/240 |
| 6,173,085 B1 * | 1/2001 | Hamilton et al. ........... | 382/263 |
| 6,215,908 B1 * | 4/2001 | Pazmino et al. ............ | 382/240 |
| 6,320,987 B1 * | 11/2001 | Chu ............................ | 382/260 |
| 6,381,373 B1 * | 4/2002 | Suzuki et al. ............... | 382/263 |
| 6,487,249 B2 * | 11/2002 | Kim et al. ............. | 375/240.21 |
| 6,539,120 B1 * | 3/2003 | Sita et al. .................... | 382/233 |
| 2002/0145745 A1 * | 10/2002 | Kanno ........................ | 358/1.9 |

FOREIGN PATENT DOCUMENTS

| | | |
|---|---|---|
| EP | 0266004 | 5/1988 |
| JP | 03256454 | 11/1991 |
| JP | 09070044 | 3/1997 |

OTHER PUBLICATIONS

Gonzalez and Woods, Digital Image Processing, 1992, Addison–Wesley Publishing Company, pp189–201.*

* cited by examiner

*Primary Examiner*—Chris Kelley
*Assistant Examiner*—George A Bugg
(74) *Attorney, Agent, or Firm*—Townsend and Townsend and Crew LLP; Kenneth R. Allen

(57) ABSTRACT

An image processing apparatus includes a spatial filter and orthogonal transform section. The spatial filter obtains a new luminance value of each pixel of an input image on the basis of a first coefficient having a first filter characteristic which forms the desired spatial frequency adjustment filter characteristic in cooperation with a second filter characteristic, thereby generating a two-dimensional intermediate image which has the adjusted spatial frequency characteristic of the input image. The orthogonal transform section performs two-dimensional orthogonal transform for the intermediate image on the basis of a second coefficient which has the second filter characteristic, which forms the desired spatial frequency adjustment filter characteristic in cooperation with the first filter characteristic, and is used for two-dimensional orthogonal transform for compressing the intermediate image generated by the spatial filter, thereby generating image data which has the adjusted spatial frequency characteristic of the intermediate image and has undergone two-dimensional orthogonal transform for image compression.

17 Claims, 13 Drawing Sheets

X(x): CHARACTERISTIC OF ONE-DIMENSIONAL DCT FILTER IN X DIRECTION
Y(y): CHARACTERISTIC OF ONE-DIMENSIONAL DCT FILTER IN Y DIRECTION
W(x,y): CHARACTERISTICS OF TWO-DIMENSIONAL FILTER, WHICH ARE CALCULATED FROM CHARACTERISTIC OF ONE-DIMENSIONAL FILTER

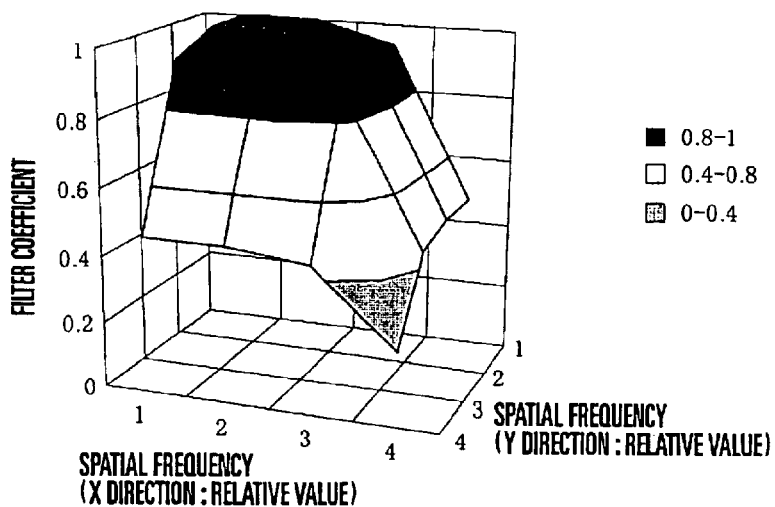
FIG. 4
FIG. 5A
| 0.5 | 0.652981 | 0.5 | 0.270598 |
|---|---|---|---|
| 0.5 | 0.270474 | 0.5 | -0.65328 |
| 0.5 | -0.27047 | 0.5 | 0.653281 |
| 0.5 | -0.65298 | 0.5 | -0.2706 |
FIG. 5B
| 0.5 | 0.652981 | 0.46875 | 0.1269673 |
|---|---|---|---|
| 0.49977002 | 0.27034918 | -0.4685344 | -0.306385 |
| 0.46875 | -0.253569 | -0.4394531 | 0.2873683 |
| 0.23460498 | -0.3063852 | 0.21994217 | -0.059574 |
| 255 | 0 | 128 | 0 |
|---|---|---|---|
| 0 | 128 | 255 | 128 |
| 255 | 128 | 0 | 255 |
| 128 | 0 | 128 | 0 |
| 201 | 58 | 90 | 18 |
|---|---|---|---|
| 70 | 135 | 171 | 78 |
| 170 | 110 | 58 | 92 |
| 82 | 19 | 23 | 13 |
FIG. 6A      FIG. 6B

IMAGE PROCESSING APPARATUS

BACKGROUND OF THE INVENTION

The present invention relates to an image processing apparatus and, more particularly, to an image processing apparatus for adjusting, at a high speed, the spatial frequency characteristic of a two-dimensional image sensed by an electronic camera apparatus when the image is to be compressed and recorded at a high speed.

An electronic camera apparatus (digital still camera) for sensing an image using an image sensing section such as a CCD adjusts the spatial frequency characteristic of an obtained two-dimensional image and compresses the image.

For example, an image obtained by a CCD using a color filter is constructed by a number of pixels having luminance values of different color components such as R, G, and B components. For this reason, pixels of the same color component are arranged in a checkerboard pattern, and actual resolution with respect to the number of pixels is low.

A general electronic camera apparatus executes processing of adjusting the spatial frequency characteristic of an input image whereby edge enhance or other image processing is performed for the input image to compensate for such deterioration in resolution.

In recent years, resolution tends to be improved by increasing the number of pixels of a CCD, and an enormous memory capacity is required to store (record) an obtained image.

Hence, in the general electronic camera apparatus, image compression processing is performed to reduce the data capacity using two-dimensional orthogonal transform without largely damaging the quality of an input image.

FIG. 20A shows the arrangement of a conventional electronic camera apparatus.

An image (RGB) photoelectrically converted by an image sensing section 11 constituted by a CCD is digitized by a signal conversion section 12. After various conversion processes including luminance/color difference signal conversion, color temperature correction, and gamma correction are executed, the image is temporarily stored in a memory 13.

An image processing apparatus 15 has a signal processing section 16 for adjusting the spatial frequency characteristic of the sensed image, a two-dimensional orthogonal transform section 18 for performing two-dimensional orthogonal transform for the image with the adjusted spatial frequency characteristic, and a quantization/compression section 18B for quantizing and compressing the transformed image data.

The signal processing section 16 is constructed by a general-purpose circuit section such as a DSP (Digital Signal Processor).

In this case, on the basis of an instruction from a control section 16B, image data 14 is sequentially read out from the memory 13, and predetermined floating-point operation is repeatedly executed using a filter coefficient 16A having a desired filter characteristic for spatial frequency characteristic adjustment to generate an intermediate image 17 having an adjusted spatial frequency characteristic.

Ito The two-dimensional orthogonal transform section 18 is constructed by a general circuit section for performing two-dimensional orthogonal transform processing such as DCT (Discrete Cosine Transform).

In this case, two-dimensional orthogonal transform processing for the intermediate image 17 is performed using a transform coefficient 18A for image data compression.

After that, the quantization/compression section 18B quantizes and compresses the image data that has undergone two-dimensional orthogonal transform to obtain compressed image data 19.

In this conventional image processing apparatus, complex floating-point operation is repeatedly executed using the signal processing section constructed by the general-purpose DSP, thereby adjusting the spatial frequency characteristic of an input image.

For this reason, the spatial frequency characteristic cannot be arbitrarily adjusted on the basis of a desired characteristic because of limitations on the time required for calculation and power consumption.

Generally, in adjusting the spatial frequency characteristic in units of matrix spaces each constructed by M×M pixels (M is an odd number; $M \geq 3$) of an input image, the spatial frequency characteristic can be arbitrarily adjusted in a wide frequency band by increasing the space size M.

However, the number of times of calculation by the DSP increases in proportion to the square of M, and the processing time and power consumption also increase.

In conventional image processing, to reduce the number of times of calculation, relatively simple adjustment is performed for the spatial frequency characteristic. More specifically, the spatial frequency characteristic is adjusted in units of small matrix spaces with a size of 3×3 pixels (M=3).

Hence, the degree of freedom of a characteristic in adjusting the spatial frequency characteristic is considerably limited, and no satisfactory image processing can be realized.

SUMMARY OF THE INVENTION

The present invention has been made to solve the above problem, and has as its object to provide an image processing apparatus capable of adjusting the spatial frequency characteristic of an input image and compressing the image using a desired filter characteristic.

In order to achieve the above object, according to the present invention, there is provided an image processing apparatus which, for an input two-dimensional image constructed by arraying, in a matrix, a number of pixels each representing a luminance value at a corresponding position, adjusts a spatial frequency characteristic on the basis of a desired spatial frequency adjustment filter characteristic, and compresses the image, comprising a spatial filter for obtaining a new luminance value of each pixel of an input image on the basis of a first coefficient having a first filter characteristic which forms the desired spatial frequency adjustment filter characteristic in cooperation with a second filter characteristic, thereby generating a two-dimensional intermediate image which has the adjusted spatial frequency characteristic of the input image, and an orthogonal transform section for performing two-dimensional orthogonal transform for the intermediate image on the basis of a second coefficient which has the second filter characteristic, which forms the desired spatial frequency adjustment filter characteristic in cooperation with the first filter characteristic, and is used for two-dimensional orthogonal transform for compressing the intermediate image generated by the spatial filter, thereby generating image data which has the adjusted spatial frequency characteristic of the intermediate image and has undergone two-dimensional orthogonal transform for image compression.

BRIEF DESCRIPTION OF THE DRAWING

FIG. 4 is a view showing a 3D model representing the two-dimensional DCT filter characteristics for spatial frequency adjustment;

FIGS. 5A and 5B are explanatory views showing generation examples of two-dimensional DCT transform coefficients for spatial frequency adjustment and two-dimensional orthogonal transform;

FIGS. 6A and 6B are explanatory views showing DCT transform results using DCT transform coefficients having a high-frequency attenuation characteristic;

DESCRIPTION OF THE PREFERRED EMBODIMENTS

The present invention will be described below with reference to the accompanying drawings.

Figure 1A:
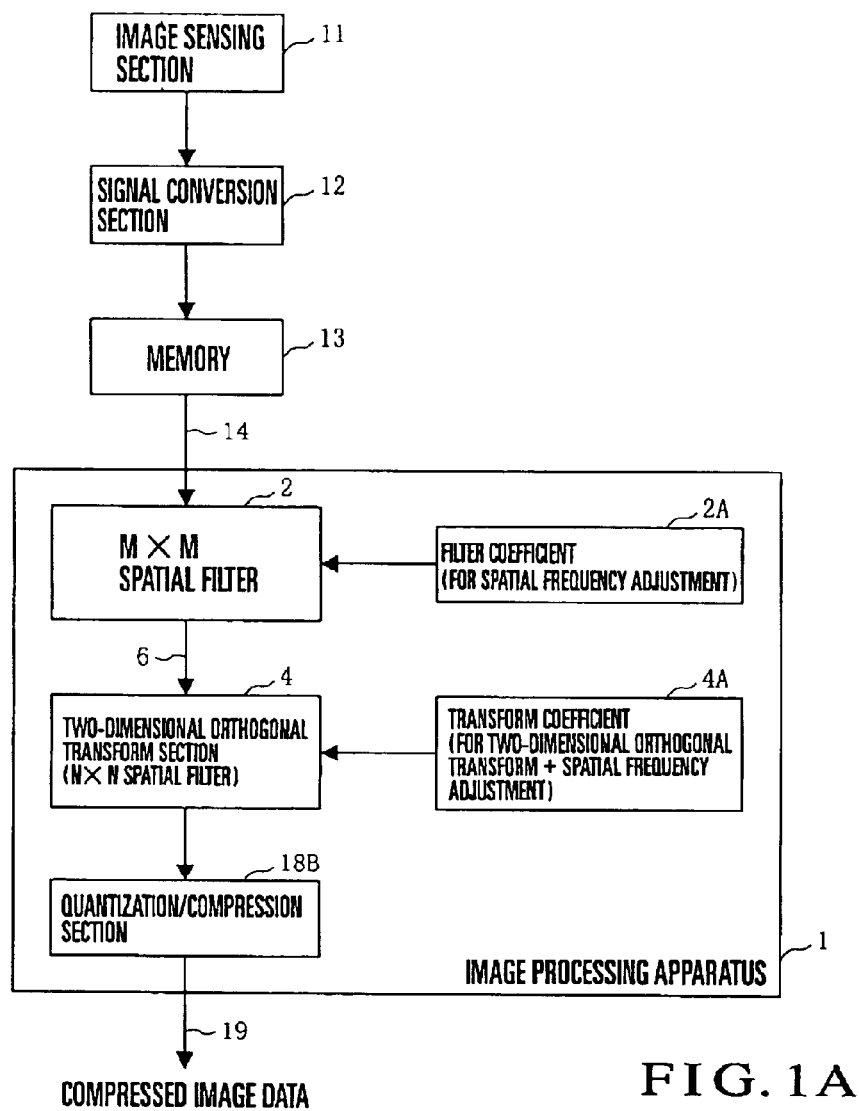
FIG. 1A is a block diagram of an electronic camera apparatus to which an image processing apparatus according to the first embodiment of the present invention is applied.

FIG. 1A shows an electronic camera apparatus to which an image processing apparatus according to the first embodiment of the present invention is applied.

Figure 1B:
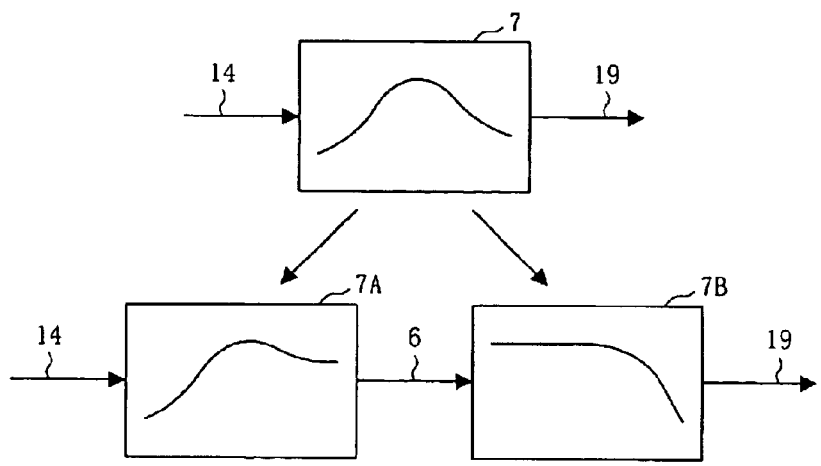
FIG. 1B is an explanatory view showing adjustment of a spatial frequency characteristic.

FIG. 1B shows adjustment processing of a spatial frequency characteristic.

An image (RGB) photoelectrically converted by an image sensing section 11 constructed by an image sensing element such as a CCD is digitized by a signal conversion section 12. After various conversion processes including luminance/color difference signal conversion, color temperature correction, and gamma correction are executed, the image is temporarily stored in a memory 13.

This image is constructed by a number of pixels arrayed in a matrix. Each pixel has a luminance signal Y and luminance values of two color difference signals.

An image processing apparatus 1 has a spatial filter 2 which adjusts the spatial frequency characteristic of an input image 14 (luminance signal Y) read out from the memory 13 on the basis of a filter coefficient 2A (first coefficient) having a filter characteristic (first filter characteristic) for spatial frequency adjustment to obtain an intermediate image 6.

The image processing apparatus also has a two-dimensional orthogonal transform section 4 for performing two-dimensional orthogonal transform for spatial frequency characteristic adjustment and compression processing for the intermediate image 6 obtained by the spatial filter 2, on the basis of a coefficient 4A (second coefficient) having two characteristics, i.e., a filter characteristic (second filter characteristic) for spatial frequency adjustment and a transform coefficient for two-dimensional orthogonal transform.

A quantization/compression section 18B quantizes and compresses the image data which has undergone two-dimensional orthogonal transform, thereby obtaining compressed image data 19.

As the spatial filter 2, a DSP may be used, as in the prior art, or an optimized circuit section may be used, as in the embodiment to be described later.

The two-dimensional orthogonal transform section 4 is constructed by a general-purpose circuit section for performing two-dimensional orthogonal transform such as DCT.

In the present invention, as shown in FIG. 1B, a desired filter characteristic 7 for spatial frequency adjustment in the entire image processing apparatus 1 is separated into a filter characteristic 7A (first filter characteristic) and filter characteristic 7B (second filter characteristic). The spatial filter 2 and two-dimensional orthogonal transform section 4 adjust the spatial frequency using filter coefficients 2A and 4A representing the filter characteristics, respectively.

That is, the filter characteristics 7A and 7B cooperatively synthesize the desired filter characteristic 7 for spatial frequency adjustment.

When the desired filter characteristic 7 for spatial frequency adjustment is separated into the filter characteristics 7A and 7B respectively matching the processing performances of the spatial filter 2 and two-dimensional orthogonal transform section 4, and the spatial frequency characteristic is adjusted by both the spatial filter 2 and two-dimensional orthogonal transform section 4, two-dimensional orthogonal transform for spatial frequency characteristic adjustment and compression processing can be performed for the input image 14 using the desired filter characteristic without adding any new circuit arrangement, unlike the prior art using a single filter characteristic.

Generally, in adjusting the spatial frequency adjustment by the spatial filter 2, the spatial frequency characteristic is adjusted in units of matrix spaces each constructed by an arbitrary central pixel on the input image and M×M pixels (M is an odd number; M≧3) in the periphery.

To obtain a desired characteristic in the intermediate- and high-frequency ranges of the spatial frequency characteristic, a relatively large matrix space need be used.

For this purpose, the desired filter characteristic 7 for spatial frequency adjustment is separated into the two filter characteristics 7A and 7B. As the filter characteristic of the filter coefficient 2A used by the spatial filter 2, generally having desired characteristic 7 with mainly adjusting the characteristic of the intermediate- to high-frequency ranges. As the filter characteristic of the transform coefficient 4A used by the two-dimensional orthogonal transform section 4, a characteristic with mostly adjusting characteristic of the high-frequency range of the desired filter characteristic 7 is prepared.

With this method, a relatively free and complex spatial frequency characteristic can be obtained without increasing the matrix space (M pixels) to be processed by the spatial filter 2.

When image data converted into a frequency space by two-dimensional orthogonal transform is subjected to filter processing, the spatial frequency is adjusted only in the closed matrix space, a luminance value difference, i.e., block distortion is generated between adjacent matrix spaces.

Especially, when DCT is used, the change in luminance value tends to be relatively large at the peripheral portion of the matrix space, so the spatial frequency cannot be largely adjusted.

However, according to the present invention, since the two-dimensional orthogonal transform section 4 adjusts the characteristic in the highest-frequency range, the characteristic in the low- to intermediate-frequency ranges need not be adjusted, and the block noise can be suppressed.

Figure 2:
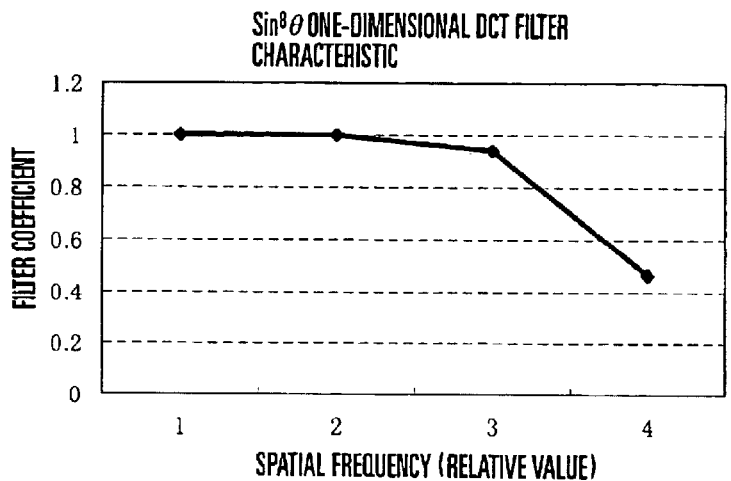
FIG. 2 is an explanatory view showing an example of a one-dimensional DCT filter characteristic for spatial frequency adjustment, which is used by an orthogonal transform section.
Figure 12:
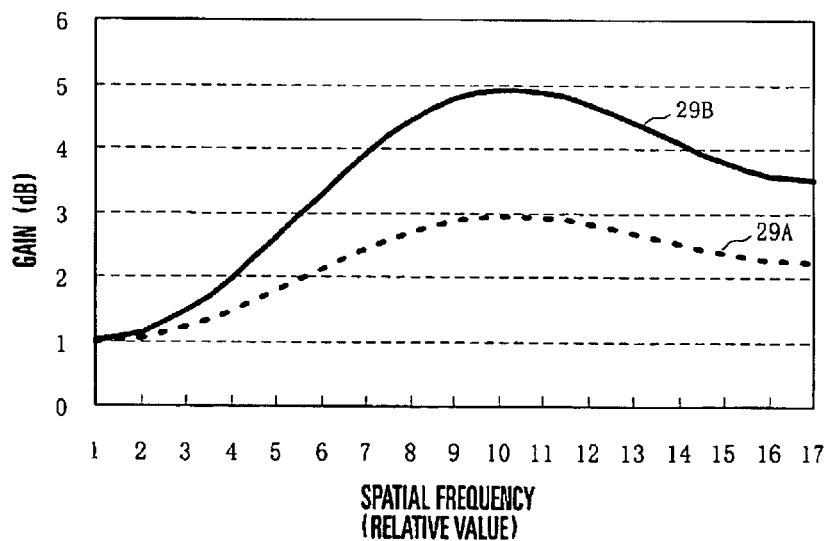
FIG. 12 is an explanatory view showing the frequency characteristic of the spatial filter.
Figure 17:
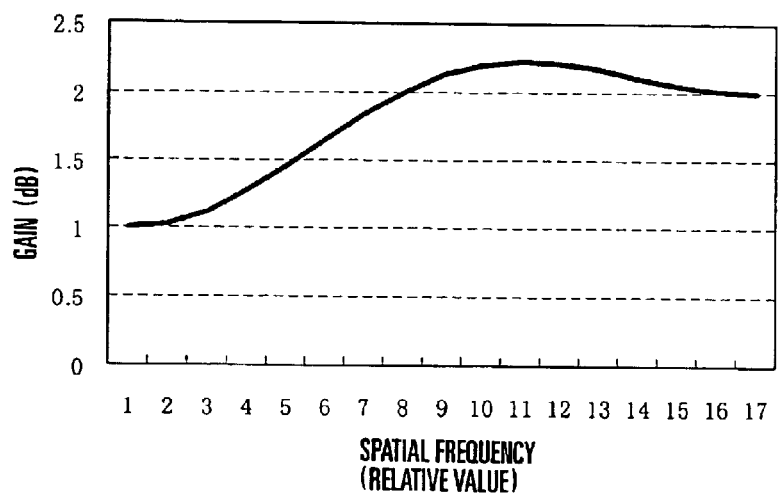
FIG. 17 is an explanatory view showing the frequency characteristic of the spatial filter.

Especially, to enhance the edge of an input image by adjusting the spatial frequency characteristic, as the filter characteristic 7A, a characteristic with a peak from the intermediate- to high-frequency portions is used, as shown in FIG. 12 or 17. As the filter characteristic 7B of the two-dimensional orthogonal transform section 4, a characteristic that cannot be realized by the spatial filter 2, i.e., that attenuates in the high-frequency range, as shown in FIG. 2 (to be described later), is used.

In this case, clear compressed image data with an emphasized high-frequency range and free from granular appearance can be obtained at a high speed and low power consumption without increasing the number of times of calculation by the spatial filter 2.

In addition, when the spatial frequency characteristic of a color difference signal is adjusted using a characteristic different from that for a luminance signal, for example, the high-frequency portion can be greatly attenuated as compared to the luminance signal, so processing equivalent to chromakeying can be performed.

A method of obtaining the transform coefficient 4A used by the two-dimensional orthogonal transform section 4 will be described next by exemplifying DCT.

The transform coefficient 4A has both the filter characteristic 7B for spatial frequency adjustment and a transform coefficient for two-dimensional orthogonal transform.

FIG. 2 shows an example of a one-dimensional DCT filter characteristic for spatial frequency adjustment which is performed by the two-dimensional orthogonal transform section.

As a one-dimensional DCT filter characteristic, a $Sin^8\theta$ high-frequency attenuation filter having four sample points is shown.

Figure 3:
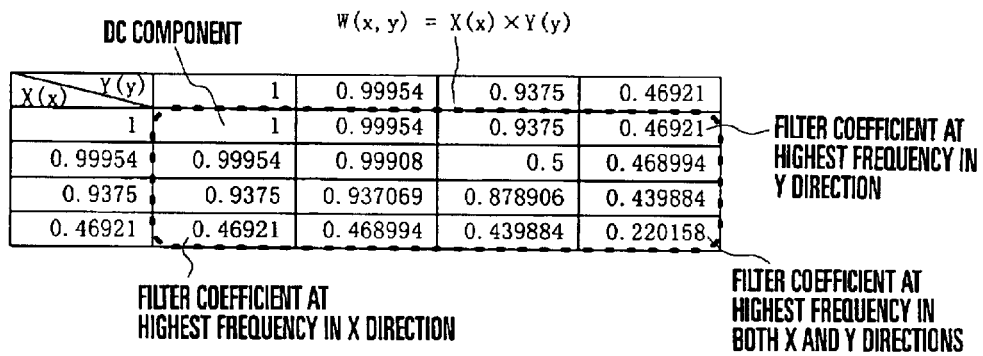
FIG. 3 is an explanatory view showing generation examples of two-dimensional DCT filter characteristics for spatial frequency adjustment.

When this one-dimensional DCT filter characteristic is arranged in the X and Y directions, as shown in FIG. 3, and coefficients X(x) and Y(y) are multiplied, a two-dimensional DCT filter characteristic, i.e., a coefficient W(x, y) of the filter characteristic 7B is obtained.

FIG. 4 shows a 3D model representing the two-dimensional DCT filter characteristics.

FIG. 5A shows transform coefficients used for DCT transform by the two-dimensional orthogonal transform section 4. When these transform coefficients and two-dimensional DCT filter coefficients shown in FIG. 3 are multiplied at the respective sample points, the transform coefficients 4A having the filter characteristic 7B are obtained, as shown in FIG. 5B.

FIGS. 6A and 6B show DCT transform results using DCT transform coefficients having a high-frequency attenuation characteristic. FIG. 6A shows pixels (luminance values) before DCT processing. FIG. 6B shows pixels (luminance values) which have undergone DCT processing (compression) and then inverse DCT processing (expansion).

Comparison between these pixels indicates that the luminance differences between pixels are smaller in FIG. 6B than in FIG. 6A, i.e., the spatial frequency is attenuated in the high-frequency range.

When an original transform coefficient used for two-dimensional orthogonal transform is multiplied by a filter coefficient for spatial frequency adjustment, which has the filter characteristic 7B, the transform coefficient 4A having both characteristics can be obtained.

When the two-dimensional orthogonal transform section 4 performs two-dimensional orthogonal transform using the transform coefficient 4A, two-dimensional orthogonal transform for spatial frequency characteristic adjustment and image compression is executed at once. For this reason, transform processing for spatial frequency characteristic adjustment using the filter characteristic 7B need not be separately performed, and the processing time and power consumption can be suppressed.

As the spatial filter 2, an arrangement for adjusting the spatial frequency characteristic in units of matrix spaces each having M×M pixels (M=3 to 5) using a DSP can be used, as in the prior art.

As filter coefficients used in this case, the sum of power values of 2 may be used as a central coefficient corresponding to the central pixel of a matrix space, and a peripheral coefficient corresponding to a peripheral pixel of the matrix space except the central pixel may be selected such that the sum of the central coefficient and the total sum of the peripheral coefficients has a power value of 2.

Figure 8A:
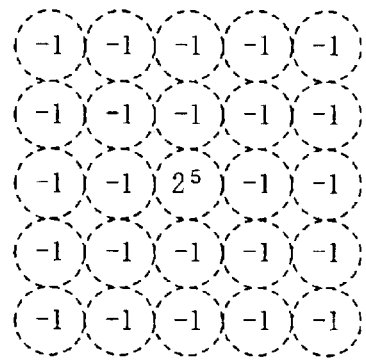
FIGS. 8A and 8B are explanatory views showing the arrangement of a spatial filter according to the second embodiment of the present invention.
Figures 14A, 14B:
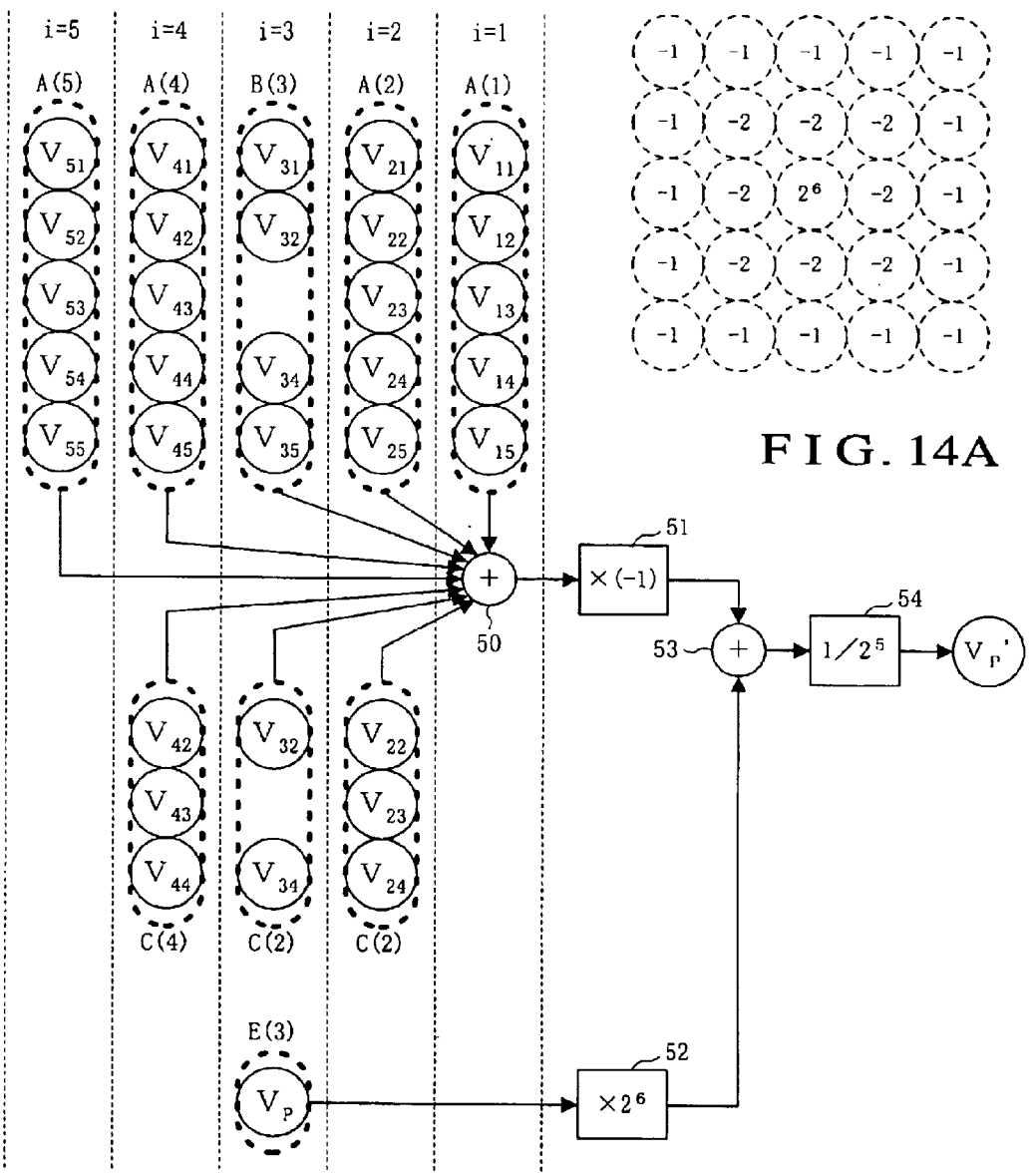
FIG. 14 is an explanatory view showing the arrangement of a spatial filter according to the fourth embodiment of the present invention.

Examples of filter coefficients satisfying the above conditions are shown in FIGS. 8A and 14A (to be described later).

When such a filter coefficient is used, the calculation process for spatial frequency characteristic adjustment by a DSP can be realized by addition of integers or multiplication and division (i.e., bit shift) of a power value of 2 with respect to an integer without using floating-point operation, unlike the prior art.

Hence, the processing time can be shortened, and power consumption can be reduced as compared to a case wherein another filter coefficient is used.

In addition, by exploiting the excess processing time and power consumption, the spatial frequency characteristic can be adjusted at a high speed even using a larger matrix space (for example, M=7 or more), and a considerably delicate filter characteristic 7A can be realized.

The second embodiment of the present invention will be described next with reference to FIGS. 7A to 8B.

Figure 7A:
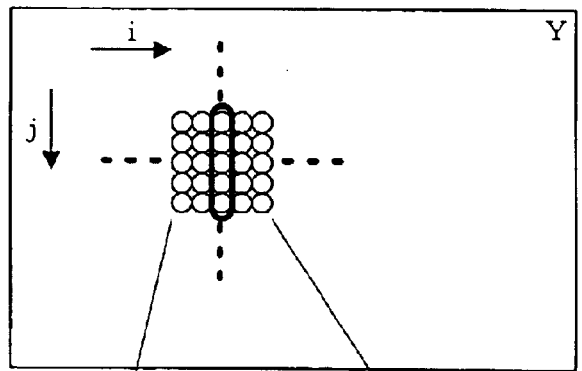
FIGS. 7A to 7C are schematic views showing a matrix space used by a spatial filter.
Figure 7B:
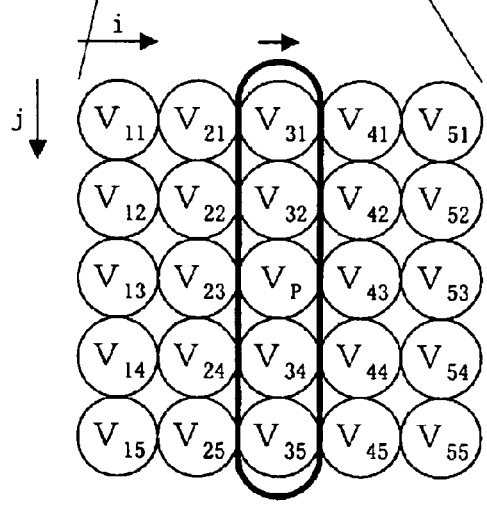
Figure 7C:
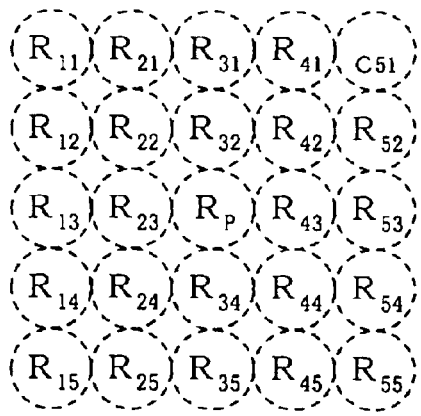

FIGS. 7A to 7C show a matrix space used by a spatial filter. FIGS. 7A and 7B show a pixel arrangement, and FIG. 7C shows filter coefficients.

Figure 8B:
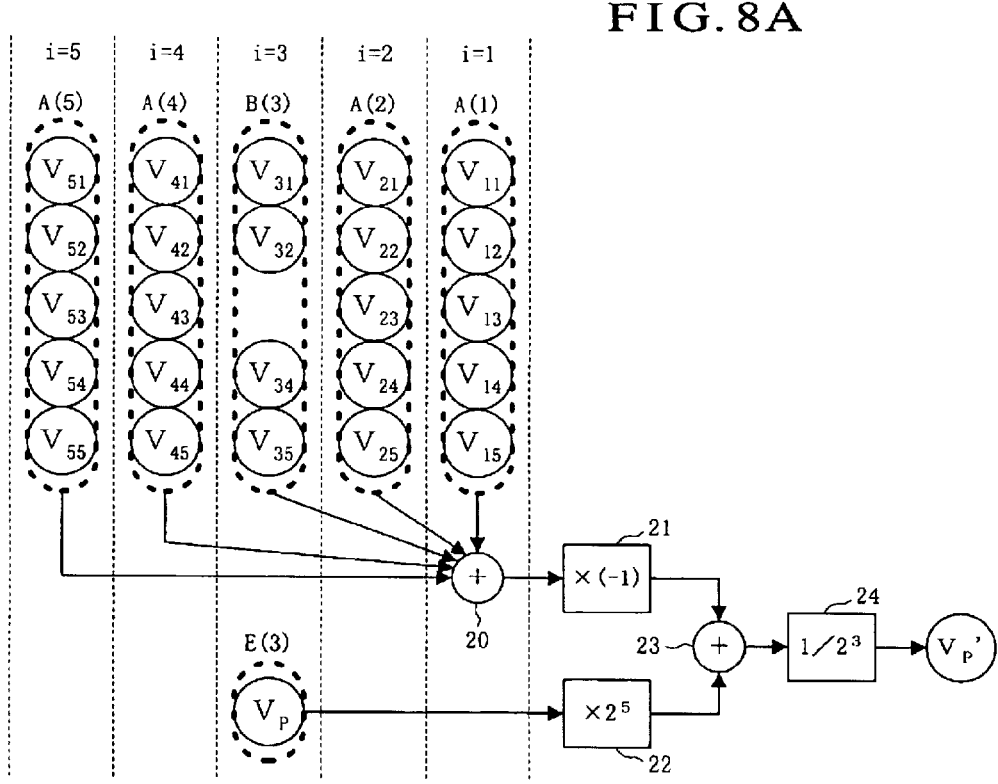

FIGS. 8A and 8B show a spatial filter according to the second embodiment. FIG. 8A shows filter coefficients, and FIG. 8B shows a block diagram.

In the above-described first embodiment, a general-purpose DSP is used as the spatial filter 2. In the second embodiment, a case wherein a spatial filter 2 is constructed by a circuit section for performing pipeline processing will be described.

Note that pipeline processing means processing of sequentially reading input data, processing them, and sequentially outputting new data.

Especially, pipeline processing by the spatial filter 2 means an operation of sequentially reading a plurality of pixels from an input image 14 and sequentially calculating and outputting new luminance values.

Generally, when the spatial frequency characteristic of a matrix space having M×M pixels is to be adjusted, a new luminance value $V_P'$ of a central pixel P located at the center of the matrix space can be expressed as the following general equation using the luminance values of the peripheral pixels.

$$V_P' = V_P \cdot R_P + \sum_{i=1}^{M} \sum_{j=1}^{M} (V_{ij} \cdot R_{ij}) R_P + \sum_{i=1}^{M} \sum_{j=1}^{M} R_{ij} = 1 \quad (1)$$

where $V_{ij}$ is the luminance value of a peripheral pixel in the matrix space, $R_{ij}$ is a filter coefficient, i.e., peripheral coefficient corresponding to the peripheral pixel, $V_P$ is the luminance value of the central pixel P in the matrix space, and $R_P$ is a filter coefficient, i.e., central coefficient corresponding to the central pixel.

In addition, i and j are integers from 1 to M excluding i=j=(M+1)/2 (i.e., the central pixel position).

The central coefficient $R_P$ and peripheral coefficients $R_{ij}$ are selected such that the sum of the central coefficient $R_P$ and all peripheral coefficients $R_{ij}$ becomes 1.

Thus, the luminance value gain by spatial frequency characteristic adjustment is 1, and only the spatial frequency characteristic is adjusted without changing the brightness of the entire image before and after adjustment.

Referring to FIGS. 7A to 7C, the spatial frequency characteristic of a matrix space having 5×5 pixels (M=5) is adjusted.

The input image 14 is constructed by a number of pixels arrayed in a matrix in a horizontal direction i and vertical direction j, as shown in FIG. 7A.

From luminance data Y of this input image 14, a matrix space having M×M pixels (M=5) with the central pixel P located at the center is extracted, as shown in FIG. 7B.

On the basis of the luminance value $V_P$ of the central pixel P of the matrix space, the luminance values $V_P'$ of the peripheral pixels, and the filter coefficients shown in FIG. 7C, the new luminance value $V_P'$ of the central pixel P is calculated using the above-described equations (1).

For example, assume that the central coefficient $R_P$ is $2^5(32)$, and peripheral coefficients $R_{11}$ to $R_{55}$ are −1, as shown in FIG. 8A. In this case, as shown in FIG. 8B, a totalizer 20 calculates the total sum of luminance values $V_{11}$ to $V_{55}$ of the peripheral pixels. When this total sum is multiplied by −1 by a multiplier (peripheral multiplier) 21, the total sum of products of the luminance values $V_{11}$ to $V_{55}$ of the peripheral pixels and corresponding peripheral coefficients $R_{11}$ to $R_{35}$ is obtained.

Also, the luminance value $V_P$ of the central pixel is multiplied by the central coefficient $R_P$ by a multiplier (central multiplier) 22, and the multiplied value is added to the output from the multiplier 21 by an adder 23.

When the output from the adder 23 is divided by a gain adjustment coefficient K (=2) by a divider 24, the new luminance value $V_P'$ of the central pixel P is obtained, with which the luminance value gain by spatial frequency characteristic adjustment is 1, and the brightness of the entire image equals that of the input image 14.

As for the calculation process of the totalizer 20, the luminance values of the peripheral pixels can be divided into pixel groups A(1), A(2), B(3), A(4), and A(5) in the vertical direction j. When five pixels $V_{i1}$, to $V_{i5}$, consecutive in the vertical direction j are sequentially received, as shown in FIG. 7B, the sums of luminance values of these pixel groups can be obtained at timings i=1 to 5.

The pixel value of the central pixel $V_P$, i.e., the pixel group E(3) is also obtained at a timing i=3.

Hence, when the sums of the luminance values of the pixel groups A, B, and E are calculated at the time of input and sequentially shifted and held at the timings i=1 to 5, the total sum of the luminance values of all pixel groups necessary for the totalizer 20 can be obtained at a timing i=5, and the new luminance value $V_P'$ of the central pixel is obtained.

As is apparent from the fact that a new pixel value $V_{43}'$ of a pixel adjacent to the central pixel in the direction i is automatically calculated at the next timing i=6, pipeline processing of sequentially receiving the luminance values $V_{i1}$ to $V_{i5}$ of five pixels consecutive in the vertical direction j and sequentially calculating the new pixel value of the central pixel is realized.

Figure 9:
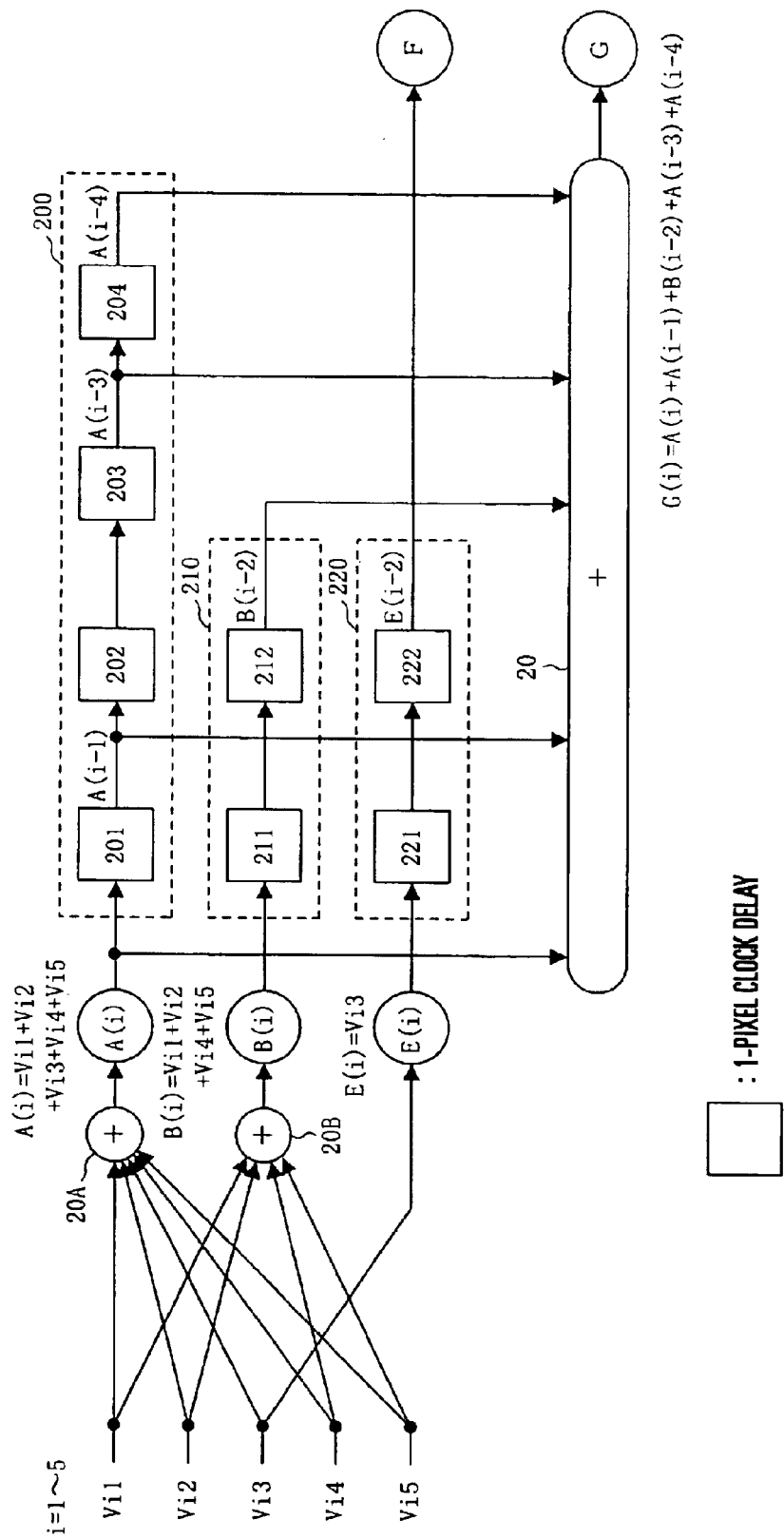
FIG. 9 is a block diagram showing the detailed arrangement of the spatial filter.
Figure 10:
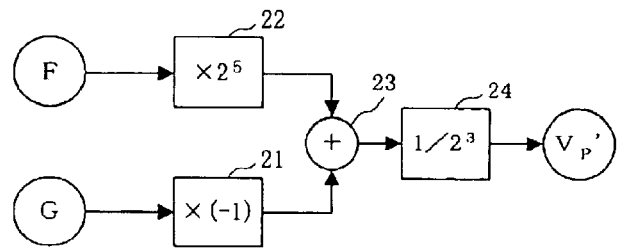
FIG. 10 is a block diagram showing the detailed arrangement of the spatial filter.

FIGS. 9 and 10 show the detailed arrangement of the spatial filter.

Referring to FIG. 9, an adder (block adder) 20A calculates a sum A(i) of the luminance values $V_{i1}$ to $V_{i5}$ of five pixels consecutive in the vertical direction j, which are parallelly input at the timing i, and an adder (block adder) 20B calculates a sum B(i) of the luminance values $V_{i1}$, $V_{i2}$, $V_{i4}$, and $V_{i5}$.

Each of shift registers 200, 210, and 220 is formed from a plurality of 1-pixel clock delays connected in series, and shifts, holds, and outputs the value A(i) at each timing i on the basis of a clock signal in the horizontal direction i.

The totalizer 20 calculates a total sum G of the output A(i) from the adder 20A and outputs A(i−1), B(i−2), A(i−3), and A(i−4) from predetermined 1-pixel clock delays of the shift registers 200, 210, and 220.

The shift register 210 outputs the luminance value $V_P$ of the central pixel P, i.e., E(i−2) as a value F.

Referring to FIG. 10, the multiplier (central multiplier) 22 multiplies the value F by the central coefficient $R_P$, the multiplier (peripheral multiplier) 21 multiplies the total sum G by the inverse peripheral coefficients $R_{11}$ to $R_{35}$ the adder 23 adds the outputs from the multipliers 21 and 22 and the divider 24 divides the output from the adder 23 by the gain adjustment coefficient K (=$2^3$).

With this arrangement, at, e.g., the timing i=5, the spatial filter shown in FIG. 8B is constructed, and the new luminance value $V_P'$ of the central pixel P is output.

When the values of the central coefficient $R_P$, peripheral coefficient $R_{11}$ to $R_{35}$ and the gain adjustment coefficient K are selected under the following conditions, the calculation process of the new luminance value $V_P'$ of the central pixel can be expressed by addition of integers and bit shift.

$$\sum_{i=1}^{M}\sum_{j=1}^{M} R_{ij} = s_1 \cdot 2^1 + s_2 \cdot 2^2 + \ldots + s_n \cdot 2^n R_p + \sum_{i=1}^{M}\sum_{j=1}^{M} R_{ij} = K = 2^k \quad (2)$$

where m and n are positive integers, $r_1, r_2, \ldots, r_n$ are 0 or 1, and $s_1, s_2, \ldots, s_n$ are 0 or −1.

More specifically, the sum of power values of 2 is selected as the central coefficient $R_P$, and the peripheral coefficient $R_{11}$ to $R_{55}$ are selected such that the sum of the central coefficient $R_P$ and the total sum of the peripheral coefficients $R_{11}$ to $R_{55}$ equals the sum of power values of 2.

In addition, a value obtained by adding the central coefficient $R_P$ to the sum of the peripheral coefficients $R_{11}$ to $R_{55}$ is set as the gain adjustment coefficient K which equals a power value of 2.

With this arrangement, the adders 20A, 20B, and 23 required to realize equations (1) can be implemented by addition of integers, and the multipliers 21 and 22 and divider 24 can be implemented by bit shift, so the circuit arrangement of the spatial filter can be greatly simplified.

Hence, the processing time necessary for adjusting the spatial frequency characteristic can be shortened, and power consumption can be reduced.

In the above description, a single power value of 2, i.e., $2^5$ is selected as the central coefficient $R_P$. To select the sum of a plurality of power values of 2, a plurality of multipliers 22 are used in correspondence with the power values of 2.

Figure 11:
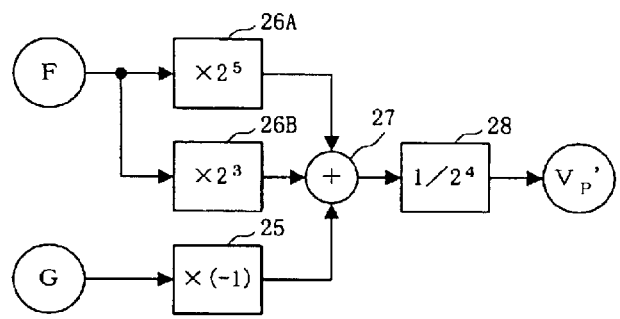
FIG. 11 is a block diagram showing another detailed arrangement of the spatial filter.

For example, as shown in FIG. 11, when $2^5+2$ is used as the central coefficient $R_P$, two multipliers 26A and 26B are parallelly arranged in place of the multiplier 22 in correspondence with the two power values.

In this case, as the gain adjustment coefficient K, the sum ($=2^4$) of the central coefficient $R_P$ ($=2^5+2^3$) and the sum of the peripheral coefficients ($=-24$) is selected.

The output from an adder 27 is divided by the gain adjustment coefficient K by a divider 28, and the new luminance value $V_P'$ of the central pixel P is obtained, with which the brightness of the entire image equals that of the input image 14.

FIG. 12 shows the filter characteristic of the spatial filter. A characteristic 29A is obtained when the filter coefficients shown in FIG. 8A are used, i.e., when the combination of the filter coefficients shown in FIGS. 9 and 10 is used.

A characteristic 29B is obtained when the combination of the filter coefficients shown in FIGS. 9 and 11 is used. Unlike the characteristic 29A, the characteristic 29B has a high gain in the intermediate- and high-frequency ranges of the spatial frequency because of the larger central coefficient $R_P$.

The third embodiment of the present invention will be described next with reference to FIG. 13.

When the spatial frequency characteristic is adjusted using a spatial filter, the optimum filter characteristic changes depending on a pixel contained in a matrix space to be processed.

In this embodiment, a plurality of filter characteristics are prepared. On the basis of a predetermined statistic amount calculated from the luminance values of pixels contained in a matrix space, one of the filter coefficients is selected to adjust the spatial frequency characteristic of an input image.

Figure 13:
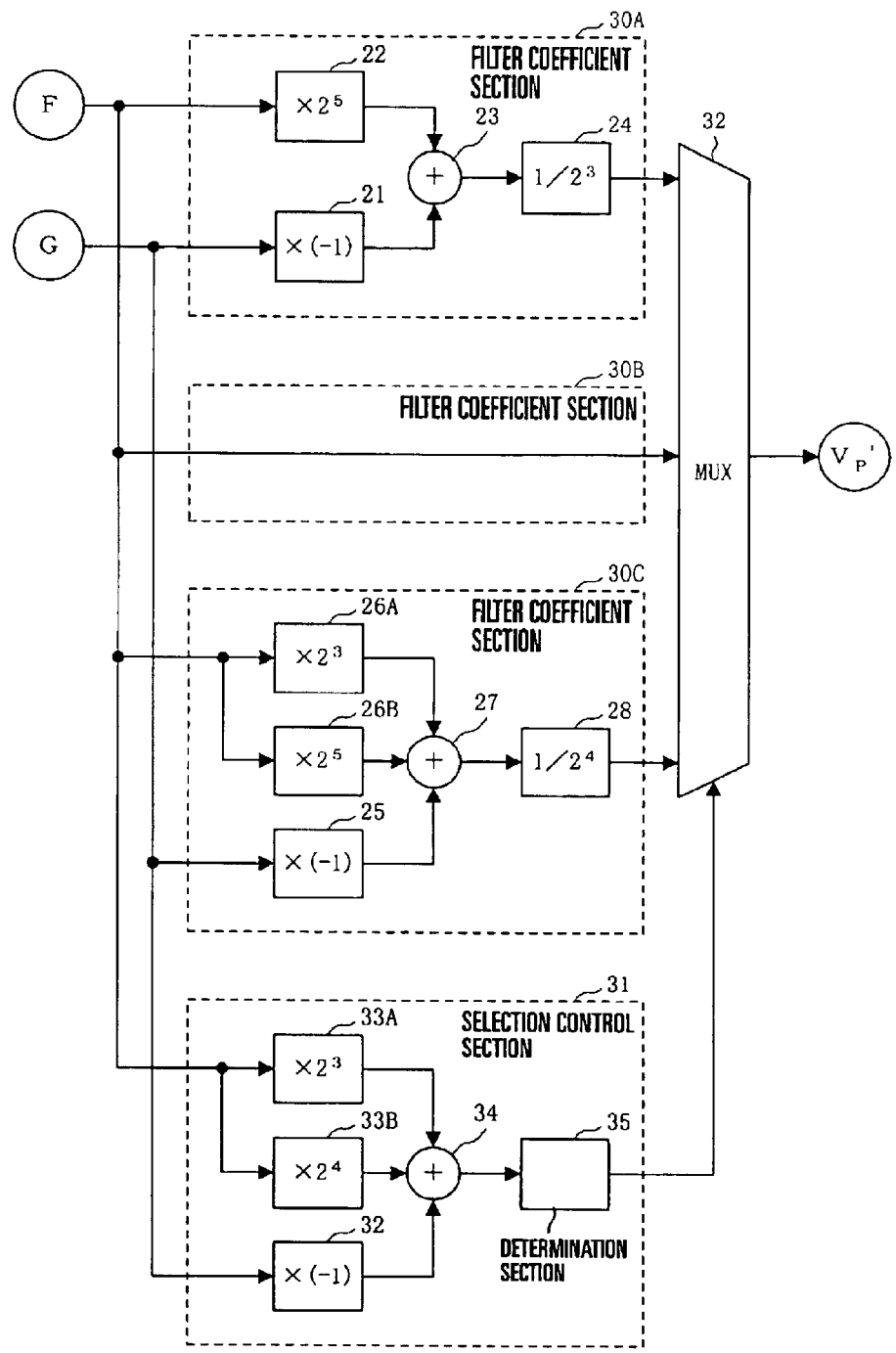
FIG. 13 is an explanatory view showing the arrangement of a spatial filter according to the third embodiment of the present invention.

Referring to FIG. 13, filter coefficient sections 30A to 30C have different filter characteristics. A selection control section 31 selects an optimum filter characteristic on the basis of a predetermined statistic amount calculated from the luminance values of pixels contained in a matrix space. A selector 36 selects one of the outputs from the filter coefficient sections 30A to 30C on the basis of an instruction from the selection control section 31.

The filter coefficients shown in FIGS. 10 and 11 are used by the filter coefficient sections 30A and 30C. The filter coefficient section 30B uses a flat filter characteristic and therefore directly outputs an input value F.

The selection control section 31 selects one of the filter characteristics on the basis of a predetermined statistic amount calculated from the luminance values of pixels contained in a matrix space, such as the average luminance of pixels in the matrix space, the difference between the luminance value of the central pixel and the average luminance in the matrix space, or the difference between the luminance value of the central pixel and the luminance value of the farthest pixel in the matrix space.

Referring to FIG. 13, the selection control section 31 uses the same circuit arrangement as that of the filter coefficient section 30A or 30C and comprises multipliers 33A and 33B for multiplying the value F by predetermined coefficients, a multiplier 32 for multiplying a total sum G by a predetermined coefficient, an adder 34 for adding the outputs from the multipliers 33A, 33B, and 32 and a determination section 35 for determining an optimum filter coefficient on the basis of the output level of the adder 34.

The circuit arrangement shown in FIG. 9 or 15 (to be described later) is connected to the input side of the circuit section shown in FIG. 13.

As described above, on the basis of a predetermined statistic value calculated from the luminance values of pixels contained in a matrix space, one of the filter coefficients is selected to adjust the spatial frequency characteristic of an input image. Even when the luminance values of pixels contained in the matrix space are unevenly distributed, the spatial frequency characteristic can be adjusted using a filter characteristic (optimum filter characteristic) corresponding to the region.

For example, if the difference in luminance between the central pixel and a peripheral pixel is small, a filter coefficient having no large gain for a high-frequency range is selected to prevent emphasis small noise. Conversely, by emphasis, an image concealed in a dark (or bright) portion can be made clear.

The fourth embodiment of the present invention will be described next with reference to FIGS. 14A and 14B.

FIGS. 14A and 14B show a spatial filter according to the fourth embodiment. FIG. 14A shows filter coefficients, and FIG. 14B shows the arrangement of the spatial filter.

In the above description, the spatial filter uses filter coefficients including peripheral coefficients all having the same value and a central coefficient having a different value. In this embodiment, a case wherein pipeline processing is performed using filter coefficients having different values as peripheral coefficients will be described.

In this embodiment, filter characteristics having different values are realized as peripheral coefficients by overlapping the pixel groups used in the above-described second embodiment by the coefficient value.

For example, as shown in FIG. 14A, a case wherein of filter coefficients to be used, the coefficients of peripheral pixels around the central pixel, i.e., pixels separated one pixel distance from the central pixel are −2, and the coefficients of pixels around these pixels are −1, will be examined.

As shown in FIG. 14B, this case can be regarded that pixel groups A(1), A(2), B(3), A(4), and A(5) with the coefficient of −1 in the case of FIG. 8B overlap new pixel groups C(2), D(3), and C(4) with the coefficients of −1.

The sums of luminance values of these pixel groups are totalized by a totalizer 50. The output is multiplied by the polarity of the peripheral coefficients of −1 by a multiplier (peripheral multiplier) 51, so the total sum of products of luminance values $V_{11}$ to $V_{55}$ of the peripheral pixels and corresponding peripheral coefficients $R_{11}$ to $R_{55}$ is obtained.

As in the above-described case, a luminance value $V_P$ of the central pixel is multiplied by a central coefficient $R_P$ by a multiplier (central multiplier) 52, and the multiplied value is added to the output from the multiplier 51 by an adder 53.

After that, the output from the adder 53 is divided by a gain adjustment coefficient K ($=2^5$) by a divider 54. A new luminance value $V_P'$ of a central pixel P is obtained, with which the luminance value gain by spatial frequency characteristic adjustment is 1, and the brightness of the entire image equals that of an input image 14.

Figure 15:
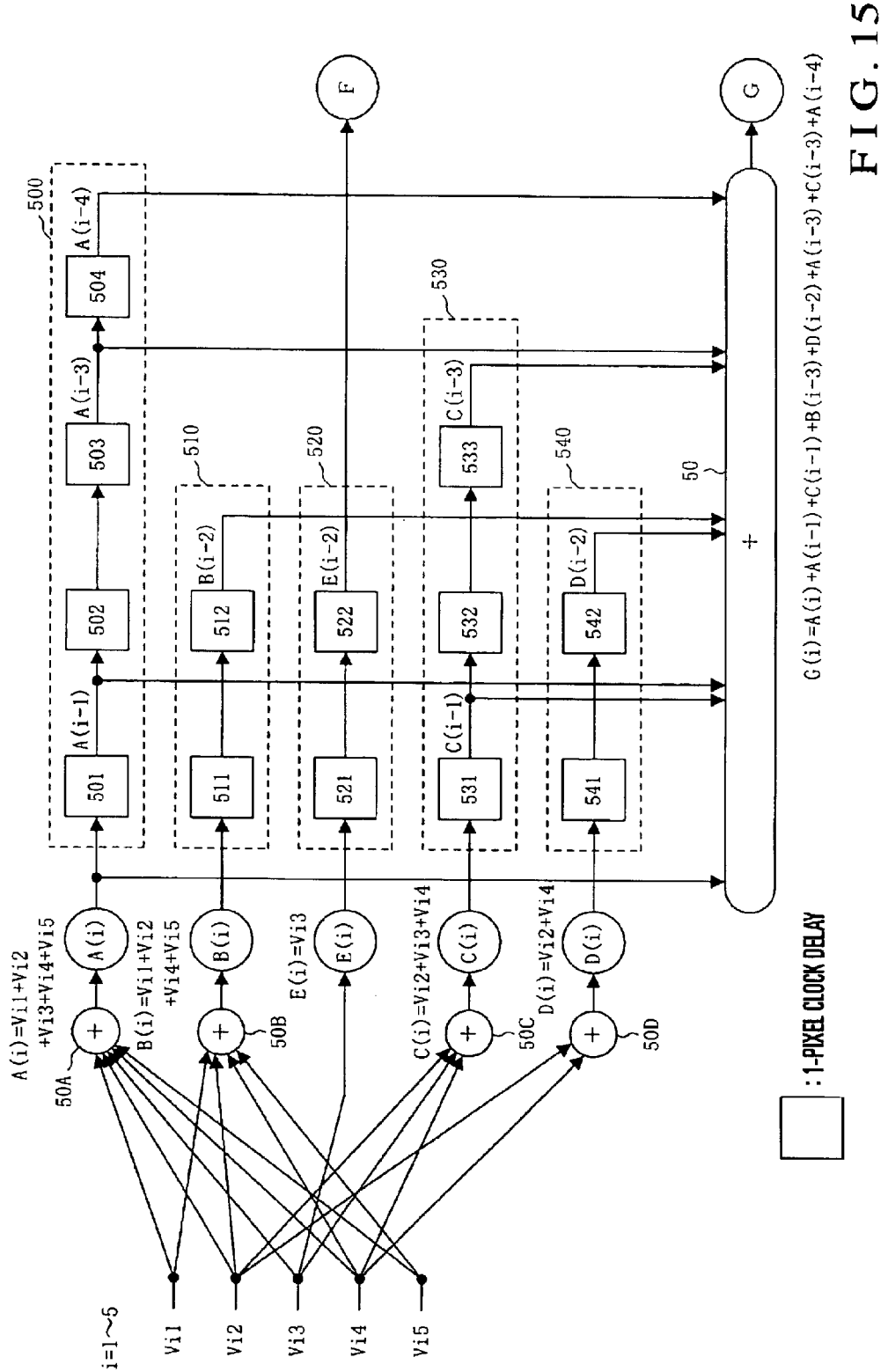
FIG. 15 is a block diagram showing the detailed arrangement of the spatial filter.

To perform this by pipeline processing, adders (block adders) 50A and 50B are provided in correspondence with the adders 20A and 20B shown in FIG. 8A, as shown in FIG. 15.

In addition, shift registers 500, 510, and 520 are provided in correspondence with the shift registers 200, 210, and 220.

An adder (block adder) 50C for obtaining the total sum of luminance values $V_{i2}$ to $V_{i4}$ of a new pixel group C, and an adder (block adder) 50D for obtaining the total sum of the luminance values $V_{i2}$ and $V_{i4}$ of a pixel group D are provided.

Also, shift registers 530 and 540 for shifting, holding, and outputting the outputs C(i) and D(i) from the adders 50C and 50D at each timing i on the basis of a clock signal in a horizontal direction i are provided.

With this arrangement, the totalizer 50 calculates a total sum G of outputs A(i), A(i−1), C(i−1), B(i−2), D(i−2), A(i−3), C(i−3), and A(i−4) from predetermined 1-pixel block delays of the shift registers 500 to 540.

The shift register 510 outputs the luminance value $V_P$ of the central pixel P, i.e., E(i−2) as a value F.

Figure 16:
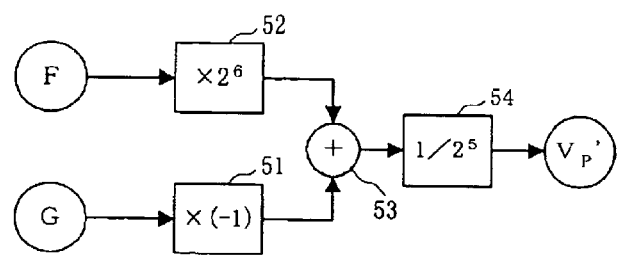
FIG. 16 is a block diagram showing the detailed arrangement of the spatial filter.

Referring to FIG. 16, a multiplier (central multiplier) 52 multiplies the value F by the central coefficient $R_P$. A multiplier (peripheral multiplier) 51 multiplies the total sum G by the polarity of the peripheral coefficients $R_{11}$ to $R_{55}$. An adder 53 adds the outputs from the multipliers 51 and 52. A divider 54 divides the output from the adder 53 by the gain adjustment coefficient K ($=2^5$).

With this arrangement, the spatial filter shown in FIG. 14B is constructed at, e.g., a timing i=5, and the new luminance value $V_P'$ of the central pixel P is output.

Generally, when filter coefficients including peripheral coefficients with the same value and a different central coefficient are used, as shown in FIG. 8A, a filter characteristic representing that the gain peak is present in the intermediate-frequency range of the spatial frequency, and the gain gradually attenuates from the intermediate-frequency portion to the high-frequency portion is obtained, as shown in FIG. 12.

To the contrary, when different coefficients are given in units of pixel groups separated from the central pixel by the same number of pixels, as shown in FIG. 14A, the filter characteristic in the high-frequency range of the spatial frequency can be controlled.

When the absolute value of the peripheral coefficient is increased as it becomes close to the central pixel, the gain of high-frequency range can be larger, as shown in FIG. 17. In addition, an intermediate image 6 with emphasized image details can be obtained.

In this embodiment as well, when the values of the central coefficient $R_P$, peripheral coefficients $R_{11}$ to $R_{55}$, and gain adjustment coefficient K are selected in accordance with the conditions represented by equations (2), the process of calculating the new luminance value $V_P$ of the central pixel can be expressed by addition of integers and bit shift, as in the second embodiment, and the same functions and effects as described above can be obtained.

The circuit arrangement shown in FIG. 14B includes the circuit arrangement shown in FIG. 8B. When an arbitrary one of the outputs from the shift registers can be selected as an input to the totalizer 50 shown in FIG. 14B, a plurality of filter coefficients can be easily switched.

Figure 18:
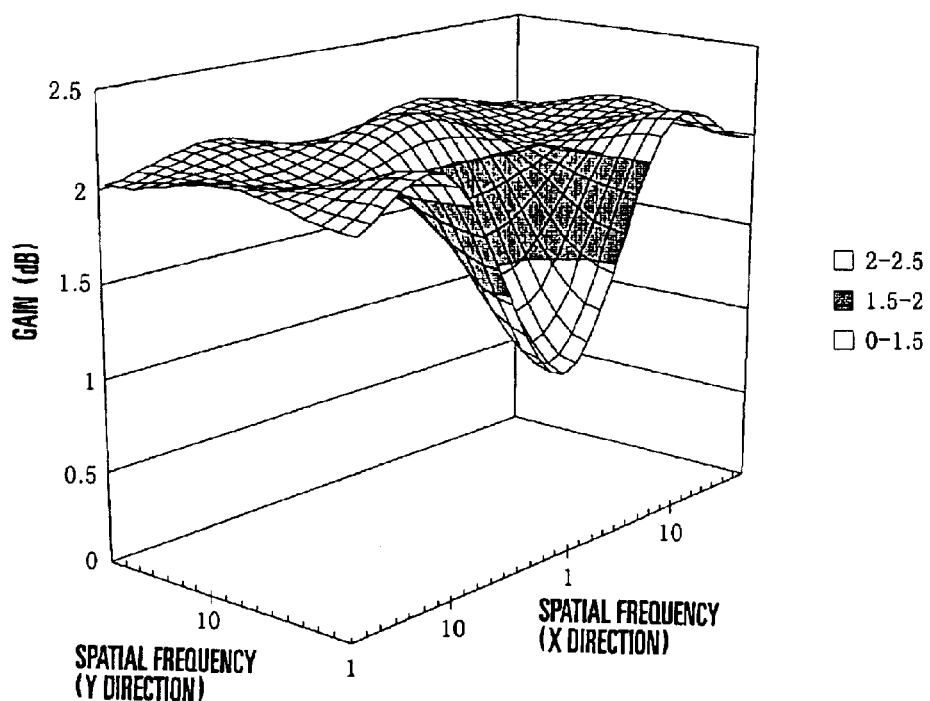
FIG. 18 is a view showing a 3D model representing the frequency characteristics of the spatial filter.

FIG. 18 shows a 3D model representing filter characteristics of the spatial filter using the filter coefficients shown in FIG. 14A. A section along the X or Y direction corresponds to the characteristic shown in FIG. 17.

Figure 19:
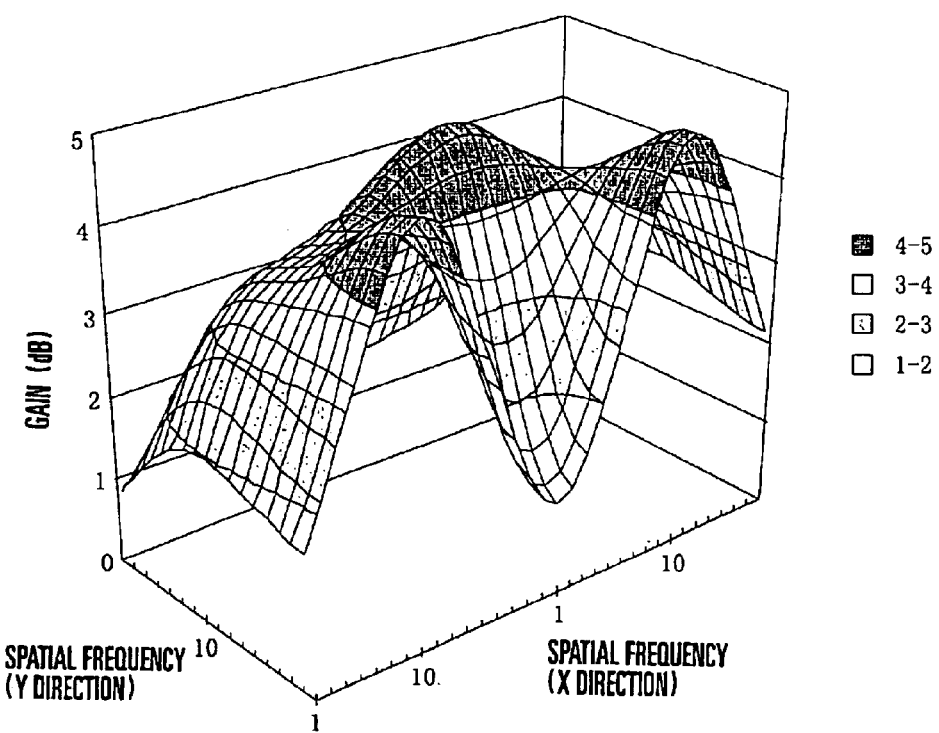
FIG. 19 is a view showing a 3D model representing the synthesized characteristics of a spatial filter and two-dimensional DCT filter.
Figure 20A:
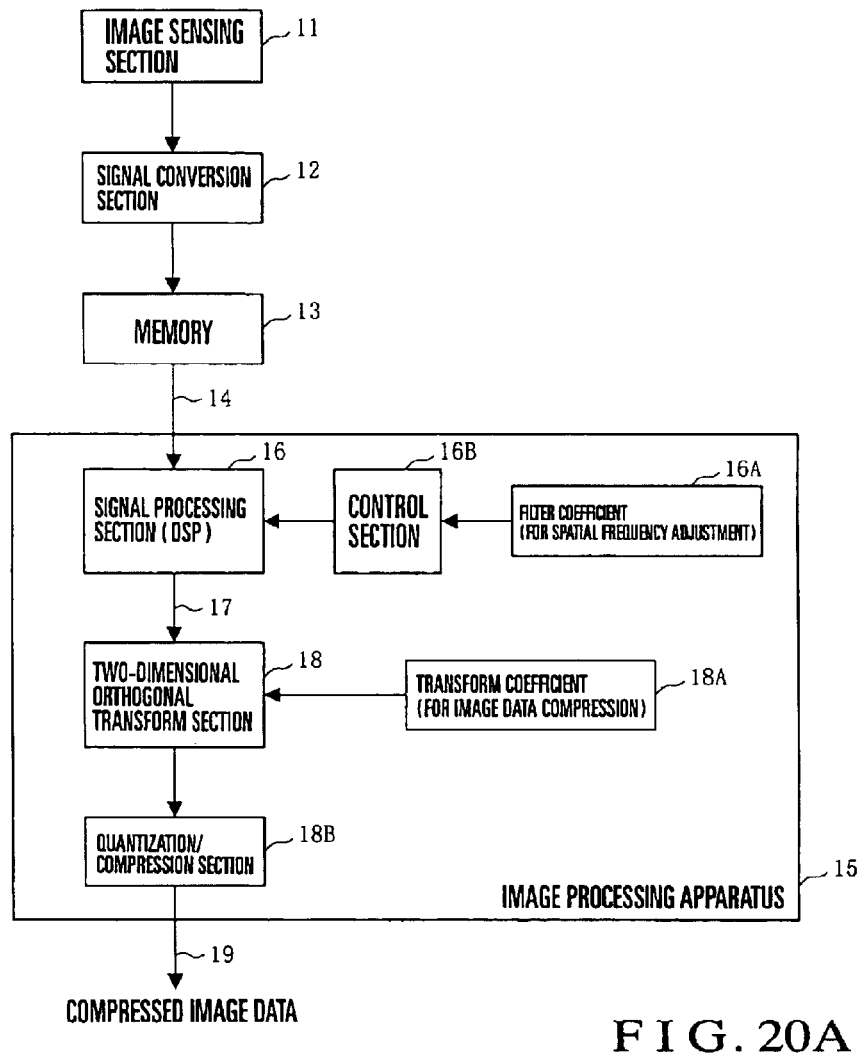
FIG. 20 is a block diagram showing an electronic camera apparatus to which a conventional image processing apparatus is applied.
Figure 20B:
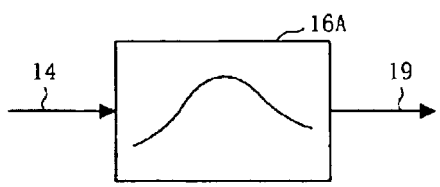

FIG. 19 shows a 3D model representing the synthesized characteristics of the spatial filter and two-dimensional DCT filter.

Referring to FIG. 19, the spatial filter characteristic shown in FIG. 18, and the two-dimensional DCT filter characteristic shown in FIG. 4, i.e., filter characteristics 7A and 7B in FIG. 1B, are synthesized. Thus, a complex filter characteristic 7 for spatial frequency adjustment can be obtained.

As has been described above, according to the present invention, a spatial filter using a first coefficient having a first filter characteristic which forms a desired spatial frequency adjustment filter characteristic in cooperation with a second filter characteristic, and an orthogonal transform section for performing two-dimensional orthogonal transform for compressing an intermediate image generated by the spatial filter, using a second coefficient having the second filter characteristic which forms the desired spatial frequency adjustment filter characteristic in cooperation with the first filter characteristic are provided to adjust the spatial frequency characteristic by both the spatial filter and the orthogonal transform section.

With this arrangement, the desired filter characteristic for spatial frequency adjustment can be separated into the first and second filter characteristics suitable for processing by the spatial filter and orthogonal transform section, and the spatial frequency characteristic can be adjusted by both the spatial filter and the orthogonal transform section. Unlike the prior art using a single filter characteristic, the spatial frequency characteristic can be adjusted, and an input image can be compressed using a desired filter characteristic for the image without adding any new circuit arrangement.

What is claimed is:

1. An image processing apparatus which, for an input two-dimensional image constructed by arraying, in a matrix, a number of pixels each representing a luminance value at a corresponding position, adjusts a spatial frequency characteristic on the basis of a desired spatial frequency adjustment filter characteristic, and compresses the image, comprising:

a spatial filter for obtaining a new luminance value of each pixel of an input image on the basis of a first coefficient having a first filter characteristic which forms the desired spatial frequency adjustment filter characteristic in cooperation with a second filter characteristic, thereby generating a two-dimensional intermediate image which has the adjusted spatial frequency characteristic of the input image; and an orthogonal transform section for performing two-dimensional orthogonal transform for the intermediate image on the basis of a second coefficient which has the second filter characteristic, which forms the desired spatial frequency adjustment filter characteristic in cooperation with the first filter characteristic, and is used for two-dimensional orthogonal transform for compressing the intermediate image generated by said spatial filter, thereby generating image data which has the adjusted spatial frequency characteristic of the intermediate image and has undergone two-dimensional orthogonal transform for image compression, wherein said orthogonal transform section segments the intermediate image generated by said spatial filter into a plurality of second regions each constructed by N×N pixels (N is an integer; N≧2), and performs two-dimensional orthogonal transform in units of second regions using N×N second coefficients having the second filter characteristic, thereby generating the image data which has the adjusted spatial frequency characteristic of the intermediate image and has undergone two-dimensional orthogonal transform for image compression;

wherein said orthogonal transform section is operative to segment the intermediate image generated by said spatial filter into a plurality of second regions each constructed by N×N pixels (N is an integer, N≧2), and to perform two-dimensional orthogonal transform in units of second regions using N×N second coefficients having the second filter characteristic, thereby generating the image data which has the adjusted spatial frequency characteristic of the intermediate image and has undergone two-dimensional orthogonal transform for image compression; and wherein as the second coefficients, N×N coefficients obtained by individually multiplying or adding N×N filter coefficients for adjusting the spatial frequency characteristic of the intermediate image and N×N transform coefficients used for two-dimensional orthogonal transform of the intermediate image are used.

2. An apparatus according to claim 1, wherein said spatial filter selects a first region constructed by M×M pixels (M is a positive odd number; M≧3) including, as a central pixel, an arbitrary pixel of the input two-dimensional image, totalizes M×M products of the M×M first coefficients having the first filter characteristic and pixels in the first region corresponding to the coefficients to obtain a new luminance value of the central pixel, and sequentially performs the operation in units of pixels constructing the input two-dimensional image, thereby generating the two-dimensional intermediate image having the adjusted spatial frequency characteristic of the input image.

3. An apparatus according to claim 2, wherein as the first coefficients, a central coefficient corresponding to the central pixel in the first region and represented by a sum of power values of 2, and peripheral coefficients corresponding to peripheral pixels formed from pixels in the first region except the central pixel are used, a sum of the central coefficient and a total sum of the peripheral coefficients having a power value of 2.

4. An apparatus according to claim 3, wherein of the peripheral coefficients, all peripheral coefficients separated outward from the central coefficient by the same number of pixels have the same power value of 2.

5. An apparatus according to claim 2, wherein of the first coefficients, a central coefficient $R_P$ corresponding to the central pixel in the first region and a peripheral coefficient $R_{ij}$ corresponding to a peripheral pixel in the first region except the central coefficient $R_P$ satisfy $$R_P = r_1 \cdot 2^1 + r_2 \cdot 2^2 + \ldots + r_m \cdot 2^m$$

$$\sum_{i=1}^{M} \sum_{j=1}^{M} R_{ij} = s_1 \cdot 2^1 + s_2 \cdot 2^2 + \ldots + s_n \cdot 2^n R_p + \sum_{i=1}^{M} \sum_{j=1}^{M} R_{ij} = K = 2^k \quad (3)$$

where m and n are positive integers, $r_1, r_2, \ldots, r_n$ are 0 or 1, and $s_1, s_2, \ldots, s_n$ are 0 or −1.

6. An apparatus according to claim 2, wherein said spatial filter adjusts the spatial frequency characteristic of the input image using, of the plurality of first coefficients having different spatial frequency characteristics, a first coefficient selected on the basis of a predetermined statistic amount calculated from the luminance values of the pixels contained in the first region.

7. An apparatus according to claim 1, wherein said orthogonal transform section performs two-dimensional orthogonal transform for adjustment of the spatial frequency characteristic of the intermediate image and image compression by two-dimensional orthogonal transform using, of the plurality of second coefficients having different spatial frequency characteristics, a second coefficient selected on the basis of a predetermined statistic amount calculated from the luminance values of the pixels contained in the second region.

8. An apparatus according to claim 6, wherein as the statistic amount, an average luminance of the pixels in each region, the difference between the luminance value of the central pixel and the average luminance of the pixels in each region, the difference between the luminance value of the central pixel and a value obtained by multiplying a pixel in each region by a predetermined coefficient, or the difference between the luminance value of the central pixel and the luminance value of the farthest pixel in each region is used.

9. An image processing apparatus which, for an input two-dimensional image constructed by arraying, in a matrix, a number of pixels each representing a luminance value at a corresponding position, adjusts a spatial frequency characteristic on the basis of a desired spatial frequency adjustment filter characteristic, and compresses the image, comprising:

a spatial filter for obtaining a new luminance value of each pixel of an input image on the basis of a first coefficient having a first filter characteristic which forms the desired spatial frequency adjustment filter characteristic in cooperation with a second filter characteristic, thereby generating a two-dimensional intermediate image which has the adjusted spatial frequency characteristic of the input image; and an orthogonal transform section for performing two-dimensional orthogonal transform for the intermediate image on the basis of a second coefficient which has the second filter characteristic, which forms the desired spatial frequency adjustment filter characteristic in cooperation with the first filter characteristic, and is used for two-dimensional orthogonal transform for compressing the intermediate image generated by said spatial filter thereby generating image data which has the adjusted spatial frequency characteristic of the intermediate image and has undergone two-dimensional orthogonal transform for image compression, wherein said orthogonal transform section segments the intermediate image generated by said spatial filter into a plurality of second regions each constructed by N×N pixels (N is an integer; N≧2), and performs two-dimensional orthogonal transform in units of second regions using N×N second coefficients having the second filter characteristic, thereby generating the image data which has the adjusted spatial frequency characteristic of the intermediate image and has undergone two-dimensional orthogonal transform for image compression;

wherein said orthogonal transform section segments the intermediate image generated by said spatial filter into a plurality of second regions each constructed by N×N pixels (N is an integer; N≧2), and performs two-dimensional orthogonal transform in units of second regions using N×N second coefficients having the second filter characteristic, thereby generating the image data which has the adjusted spatial frequency characteristic of the intermediate image and has undergone two-dimensional orthogonal transform for image compression; and wherein as the statistic amount, an average luminance of the pixels in each region, the difference between the luminance value of the central pixel and the average luminance of the pixels in each region, the difference between the luminance value of the central pixel and a value obtained by multiplying a pixel in each region by a predetermined coefficient, or the difference between the luminance value of the central pixel and the luminance value of the farthest pixel in each region is used.

10. An image processing apparatus which, for an input two-dimensional image constructed by arraying, in a matrix, a number of pixels each representing a luminance value at a corresponding position, adjusts a spatial frequency characteristic on the basis of a desired spatial frequency adjustment filter characteristic, and compresses the image, comprising:

a spatial filter for obtaining a new luminance value of each pixel of an input image on the basis of a first coefficient having a first filter characteristic which forms the desired spatial frequency adjustment filter characteristic in cooperation with a second filter characteristic, thereby generating a two-dimensional intermediate image which has the adjusted spatial frequency characteristic of the input image; and an orthogonal transform section for performing two-dimensional orthogonal transform for the intermediate image on the basis of a second coefficient which has the second filter characteristic, which forms the desired spatial frequency adjustment filter characteristic in cooperation with the first filter characteristic, and is used for two-dimensional orthogonal transform for compressing the intermediate image generated by said spatial filter, thereby generating image data which has the adjusted spatial frequency characteristic of the intermediate image and has undergone two-dimensional orthogonal transform for image compression, wherein said orthogonal transform section segments the intermediate image generated by said spatial filter into a plurality of second regions each constructed by N×N pixels (N is an integer; N≧2), and performs two-dimensional orthogonal transform in units of second regions using N×N second coefficients having the second filter characteristic, thereby generating the image data which has the adjusted spatial frequency characteristic of the intermediate image and has undergone two-dimensional orthogonal transform for image compression;

wherein the first coefficients comprise a central coefficient having a positive coefficient value corresponding to a central pixel as an arbitrary pixel in a first region having M×M pixels (M is an odd number; M≧3) and (M×M−1) peripheral coefficients corresponding to peripheral pixels formed from pixels in the first region except the central pixel in the input image formed from a number of pixels two-dimensionally arrayed along directions i and j perpendicular to each other, each peripheral coefficient having a negative coefficient value, said spatial filter has a pipeline processing section comprising:

a plurality of block adders for calculating and outputting a sum of luminance values of pixels belonging to an individual block in units of predetermined blocks each constructed by at least one of the M pixels parallelly received from the input image;

a plurality of shift registers provided in correspondence with said block adders to sequentially shift outputs from said block adders in synchronism with a predetermined clock signal by a predetermined number of stages, and hold and output the outputs;

an adder for selectively totalizing predetermined output values of output values from said block adders and output values from said shift registers to output a value obtained by totalizing (M×M−1) products of the luminance values of the individual peripheral pixels of the M×M pixels in the first region and absolute values of the peripheral coefficients corresponding to the peripheral pixels;

a peripheral multiplier for multiplying an output from said totalizer by −1;

a central multiplier for multiplying the luminance value of the central pixel, which is held by one of said shift registers, by the central coefficient and outputting the value;

an adder for adding an output from said central multiplier to an output from said peripheral multiplier and outputting a sum value; and a divider for dividing the output from said adder to output a new luminance value of the central pixel, and the two-dimensional intermediate image having the adjusted spatial frequency characteristic of the input image is obtained by scanning the pixels on the input image one by one in an i direction and one by one in a j direction in synchronism with a predetermined clock signal to parallelly receive M pixels arrayed adjacent along the j direction by said pipeline processing section and sequentially calculating the new luminance value of the central pixel of the received M×M pixels.

11. An apparatus according to claim 10, the central coefficient of the first coefficient is a power value of 2, and said central multiplier bit-shifts the luminance value of the central pixel in an upper bit direction by the power value of 2 forming the central coefficient, thereby calculating and outputting the product of the luminance value of the central pixel and the central coefficient.

12. An apparatus according to claim 10, the central coefficient of the first coefficient is a sum of a plurality of power values of 2, said central multiplier comprises a plurality of multipliers parallelly arranged in correspondence with the power values of 2 forming the central coefficient, and each multiplier bit-shifts the luminance value of the central pixel in the upper bit direction by the corresponding power value of 2, thereby calculating and outputting the product of the luminance value of the central pixel and the central coefficient.

13. An apparatus according to claim 10, wherein the central coefficient and the peripheral coefficients of the first coefficient are set such that a sum of the central coefficient and a total sum of the peripheral coefficients has a power value of 2, and said divider divides the output from said adder by bit-shifting the output from said adder in a lower bit direction by the power value of 2 representing the sum of the central coefficient and the total sum of the peripheral coefficients.

14. An apparatus according to claim 1, wherein as the first filter characteristic for emphasizing intermediate- to high-frequency portions of the spatial frequency characteristic is used.

15. An apparatus according to claim 14, wherein as the second filter characterstic, a characteristic for attenuating a high-frequency portion of the spatial frequency characteristic is used.

16. An apparatus according to claim 2, wherein the first filter characteristics having different spatial frequency characteristics are individually used for a luminance signal and color difference signals.

17. An apparatus according to claim 2, wherein the second filter characteristics having different spatial frequency characteristics are individually used for a luminance signal and color difference signals.

* * * * *